US012452634B2

(12) United States Patent
Guajardo et al.

(10) Patent No.: US 12,452,634 B2
(45) Date of Patent: Oct. 21, 2025

(54) SPECTRUM MANAGEMENT BETWEEN WIRELESS NETWORKS

(71) Applicant: DISH Wireless L.L.C., Englewood, CO (US)

(72) Inventors: Marcel Guajardo, Lakewood, CO (US); Owen Christens-Barry, Castle Rock, CO (US)

(73) Assignee: DISH Wireless L.L.C., Englewood, CO (US)

( * ) Notice: Subject to any disclaimer, the term of this patent is extended or adjusted under 35 U.S.C. 154(b) by 382 days.

(21) Appl. No.: 17/861,152

(22) Filed: Jul. 8, 2022

(65) Prior Publication Data
US 2024/0015485 A1   Jan. 11, 2024

(51) Int. Cl.
| H04W 4/24 | (2024.01) |
| H04W 16/14 | (2009.01) |
| H04W 28/16 | (2009.01) |
| H04W 64/00 | (2009.01) |
| H04W 72/0453 | (2023.01) |

(52) U.S. Cl.
CPC .............. *H04W 4/24* (2013.01); *H04W 16/14* (2013.01); *H04W 28/16* (2013.01); *H04W 64/00* (2013.01); *H04W 72/0453* (2013.01)

(58) Field of Classification Search
CPC ....... H04W 4/24; H04W 16/14; H04W 28/16; H04W 64/00; H04W 72/0453

USPC .......................................................... 455/406
See application file for complete search history.

(56) References Cited

U.S. PATENT DOCUMENTS

| 2013/0295948 A1* | 11/2013 | Ye ........................ H04W 16/14 |
| | | 455/452.1 |
| 2020/0259896 A1* | 8/2020 | Sachs ....................... H04L 67/12 |
| 2021/0368514 A1* | 11/2021 | Xing .................... H04L 41/0896 |

* cited by examiner

*Primary Examiner* — Joel Ajayi
(74) *Attorney, Agent, or Firm* — Perkins Coie LLP

(57) ABSTRACT

The present disclosure is directed to methods and systems for spectrum leasing. The spectrum leasing system performs a set of functions to provide potential leasing customers with flexible leasing options. The spectrum leasing system can utilize inputs such as: customer problems, size and type of customer premises, list of customer location(s), requested spectrum bands, requested network capability at a customer location, and geographic information system (GIS) information about the customer premises, nearby buildings, and venues The spectrum leasing system can use the input information to identify and select leasing and monetization opportunities for customers. In some implementations, the spectrum leasing system analyzes a network provider spectrum portfolio, proximity of existing and planned public network cell sites, and a set of pre-established business rules for spectrum leasing to identify spectrum bands available for leasing and determine pricing of the lease.

20 Claims, 7 Drawing Sheets

SPECTRUM MANAGEMENT BETWEEN WIRELESS NETWORKS

BACKGROUND

A network provider can provide a customer access to an electromagnetic spectrum of frequency bands via a spectrum lease. However, during spectrum leasing, a network provider must consider the risk of interference between spectrum usage on its public network and private networks.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
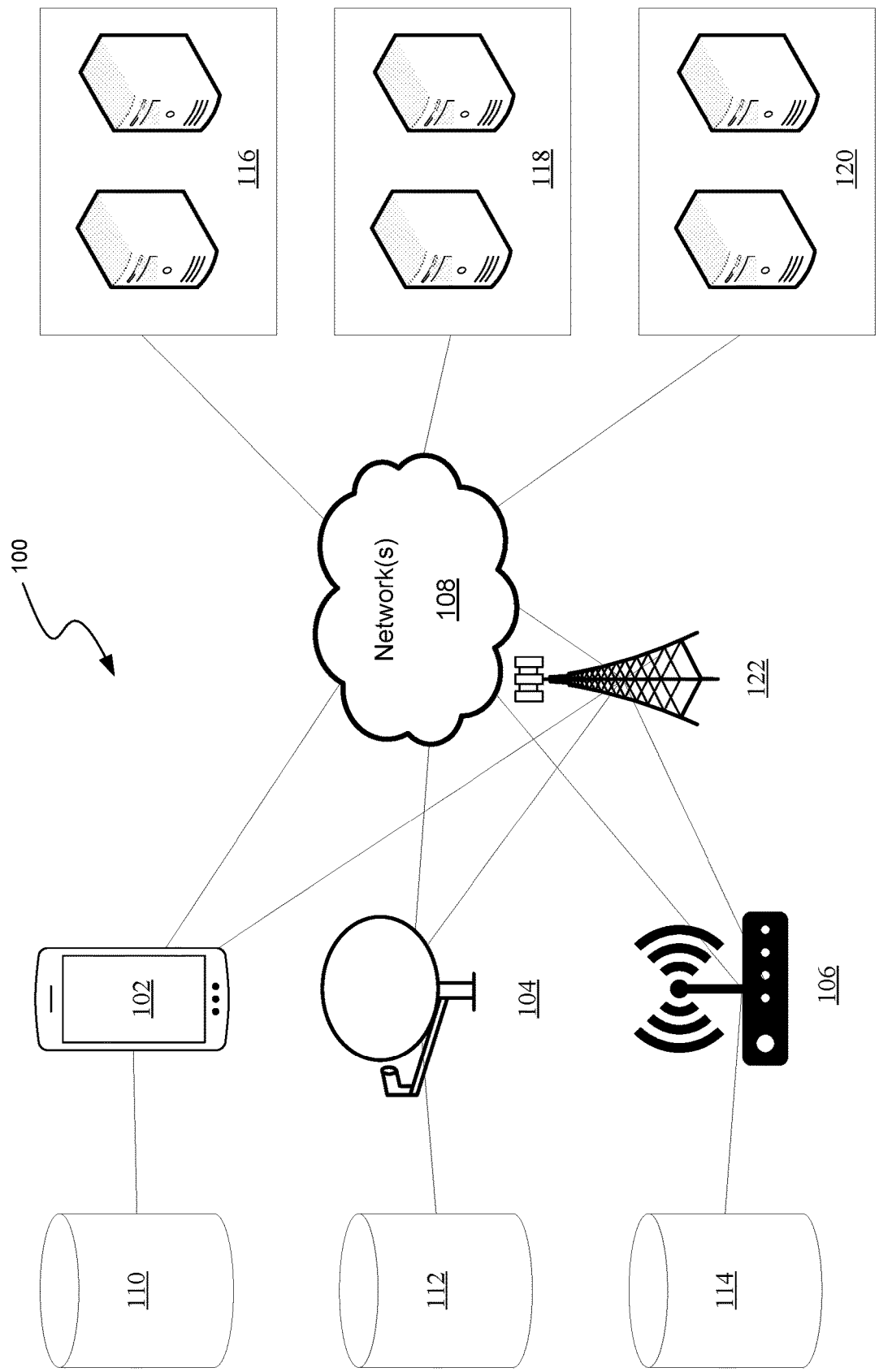
FIG. 1 illustrates an example of a distributed system for spectrum leasing, in accordance with one or more embodiments of the present technology.

Aspects of the present disclosure are directed to systems and methods for spectrum leasing a spectrum leasing system. The spectrum leasing system evaluates interference constraints, public and private bandwidth availability, and customer requirements, in order to make a proposal for short-term or long-term spectrum leasing arrangements for customers. As spectrum leasing demand increases, prospective enterprise customer types can include: 1) those who already understand the value of a licensed spectrum and are already shopping for it, and 2) those who don't yet understand its value over unlicensed spectrum. Customers can require flexible options when it comes to leasing the spectrum. In a first example, a customer (e.g., smart utilities, manufacturing sites, etc.) requires extended terms such as 5-, 10-, or 15-year lease terms. In a second example, a customer requires a shortened term, such as 1- or 2-week terms, for a particular event (e.g., sporting events, concerts, festivals, etc.). In a third example, a customer requires a spectrum band for private, indoor use cases. For all spectrum leasing options, the network provider can consider the risk of interference between spectrum usage on its public network and private networks. Current existing spectrum leasing systems don't support a network provider's ability to manage the allocation of the same spectrum channels across multiple subscribers over a large-footprint, public (nationwide) network and multiple private networks. Methods and systems disclosed herein can provide technical advantages over conventional systems. The disclosed spectrum leasing system provides flexible spectrum leasing options that serve all enterprise customer types and requirements.

The spectrum leasing system performs a set of functions to provide potential leasing customers with flexible leasing options. The spectrum leasing system can utilize input information such as: customer problems, size and type of customer premises, list of customer location(s), requested spectrum bands, requested network capability at a customer location, and geographic information system (GIS) information about the customer premises, nearby buildings and venues. The spectrum leasing system can use the input information to identify and select leasing and monetization opportunities for customers. In some implementations, the spectrum tool analyzes a network provider spectrum portfolio, proximity of existing and planned public network cell sites, existing customers already leasing spectrum bands, and a set of pre-established business rules for spectrum leasing (e.g., CBRS is off limits for leasing in dense urban markets, outdoor usage is prohibited in specific markets, indoor usage restrictions, height restrictions, property type restrictions, etc.) to identify spectrum bands available for leasing. The spectrum leasing system prescribes options to lease spectrum for any length of service and allow for spectral lease pricing to vary during the duration of service (e.g., peak vs. non-peak). The spectrum leasing system analyzes market variables for pricing, all adjacent enterprise customers' current demand for spectrum leasing, and delivers a quantitative estimate of available spectral bands.

The spectrum leasing system can manage the public and private spectrum bands in a company portfolio. For example, if a company makes available some of the spectrum for a private enterprise user in a particular market, the spectrum leasing system ensures that the private enterprise user will not experience interference from the public network serving the location of the private enterprise user. The spectrum leasing system prevents conflicts between customers (private customer and other private customers, private and public customers, or public and other public customers), so that users of the network can experience a QOS above a threshold value.

FIG. 1 illustrates an example of a distributed system for spectrum leasing. Example system 100 presented is a combination of interdependent components that interact to form an integrated whole for leasing spectrum bands. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to support accessing a spectrum leasing system to input information and view/receive leasing information for spectrum bands. In one example, a client device 102 may be a mobile phone, a client device 104 may be a smart OTA antenna, and a client device 106 may be a broadcast module box (e.g., set-top box). In other example aspects, client device 106 may be a gateway device (e.g., router) that is in communication with sources, such as ISPs, cable networks, internet providers, or satellite networks. Other possible client devices include but are not limited to tablets, personal computers, televisions, etc. In aspects, a client device, such as client devices 102, 104, and 106, may have access to a network from a gateway. In other aspects, client devices 102, 104, and 106, may be equipped to receive data from a gateway. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run software that allows a user to access the spectrum leasing system, enter customer information, and receive leasing options such as length of service, pricing, available spectral bands, and contracts. Client devices 102, 104, and 106 may access spectrum leasing system and leasing content data through the networks. The leasing content data may be stored locally on the client device or run remotely via network(s) 108. For example, a client device may receive a signal from broadcast tower 122 containing content data. The signal may indicate user requested leasing content. The client device may receive this user requested content data and subsequently store this data locally in databases 110, 112, and/or 114. In alternative scenarios, the user requested content data may be transmitted from a client device (e.g., client device 102, 104, and/or 106) via network(s) 108 to be stored remotely on server(s) 116, 118, and/or 120. A user may subsequently access the content data from a local database (110, 112, and/or 114) and/or external database (116, 118, and/or 120), depending on where the content data may be stored. The system may be configured to receive and process user requested content data in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the content data from a channel from an OTA antenna (e.g., antenna 104). A graphical user interface may display on the mobile device 102 the requested content data. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in providing a user access to the spectrum leasing system. Such databases may contain certain content data such as available spectral bands, terms of service, price per band per location information, or length of service. Such data may be transmitted via network(s) 108 to client devices 102, 104, and/or 106 to assist in identifying available spectral bands for lease. Because broadcast tower 122 and network(s) 108 are configured to communicate with one another, the systems and methods described herein may be able to identify requested content in different sources, such as streaming services, local and cloud storage, cable, satellite, or OTA.

Figure 2:
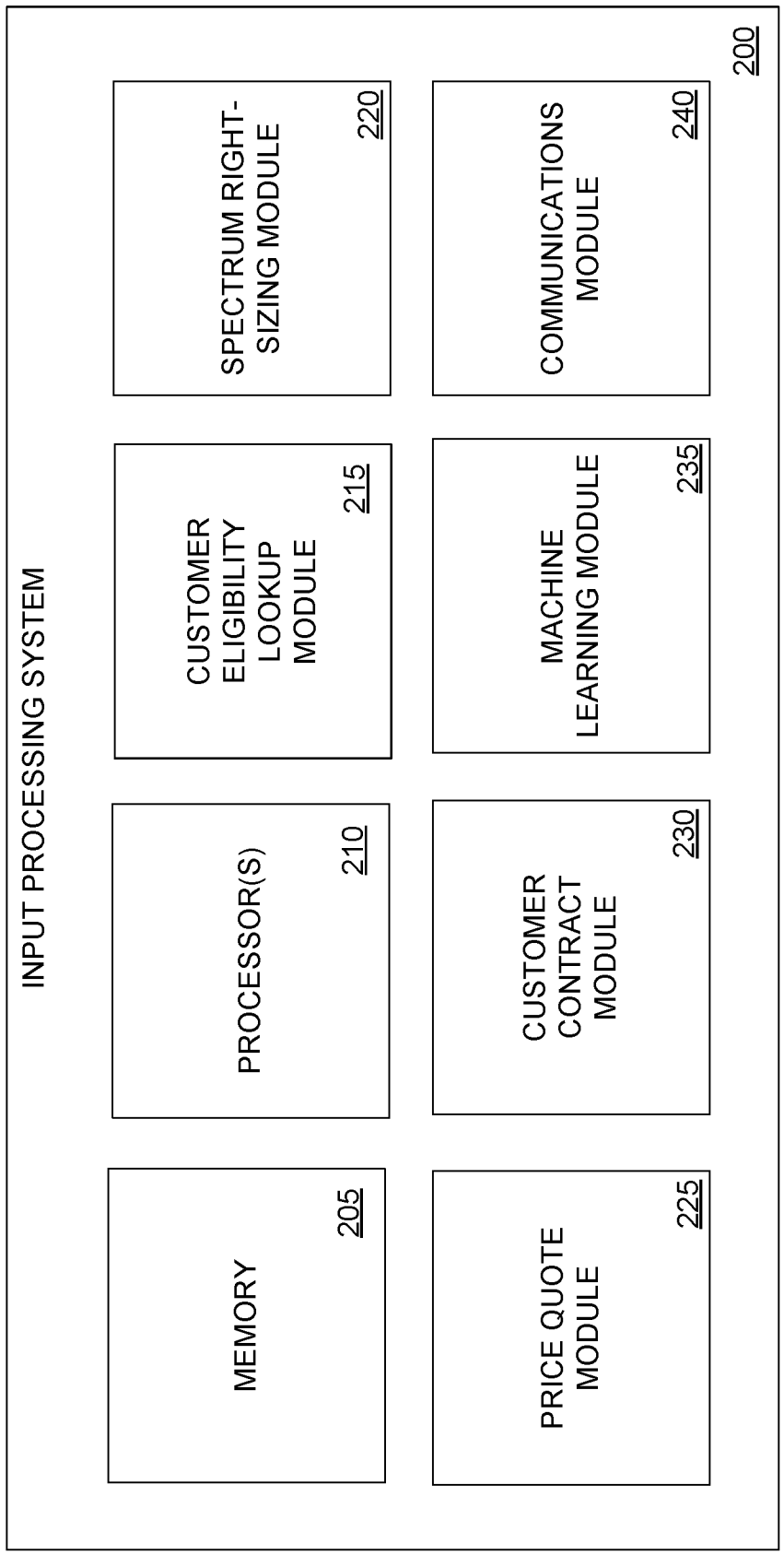
FIG. 2 illustrates an example input processing system for implementing systems and methods for spectrum leasing, in accordance with one or more embodiments of the present technology.

FIG. 2 illustrates an example input processing system for implementing systems and methods for spectrum leasing. The input processing system 200 (e.g., one or more data processors) is capable of executing algorithms, software routines, and/or instructions based on processing data provided by a variety of sources related to spectrum leasing. The input processing system can be a general-purpose computer or a dedicated, special-purpose computer. According to the embodiments shown in FIG. 2, the disclosed system can include memory 205, one or more processors 210, customer eligibility lookup module 215, spectrum right-sizing module 220, price quote module 225, customer contract module 230, machine learning module 235, and communications module 240. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of customer eligibility lookup module 215, spectrum right-sizing module 220, price quote module 225, customer contract module 230, machine learning module 235, and communications module 240. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing the spectrum leasing information and spectrum leasing system.

Customer eligibility lookup module 215 may be configured to receive customer inputs such as: customer network problems, size and type of customer premises, requested spectrum bands, geographic information of the customer location, or duration of service. A potential customer interested in leasing spectrum bands can utilize the eligibility lookup tool to learn what spectral bands are available at a location, generate inquiries, and perform eligibility checks for spectrum leases. The customer eligibility lookup module 215 can collect GIS information about nearby buildings and venues to the customer location to identify and select additional monetization opportunities for the customer. The customer eligibility lookup module 215 can collect pre-sales information to evaluate spectral sale feasibility and customer eligibility based on pre-set business rules regarding what bands are available for lease to the customer location. An external portal (e.g., public facing tool for potential customers) and/or an internal portal (e.g., network provider employees) can input information into the customer eligibility lookup module 215.

Spectrum right-sizing module 220 may be configured to analyze a network provider spectrum portfolio to identify available spectral bands that can support the customers inquiry. The spectrum right-sizing module 220 can identify the proximity of existing and planned public network cell sites to the customer location and pre-established business rules for spectrum leasing (e.g., CBRS is off limits for leasing in dense urban markets, outdoor usage is prohibited in specific markets, indoor usage restrictions, height restrictions, property type restrictions, etc.). The spectrum right-sizing module 220 can analyze existing customers currently leasing spectrum bands to identify the length of the lease and when those spectrum bands become available for leasing to other customers. After analysis, the spectrum leasing system prescribes options to lease available spectrum for various service lengths. The spectrum right-sizing module 220 can include a spectrum registry and leasing database. The spectrum registry and leasing database is a service provider internal database containing information of all the spectrum bands, what spectrum bands are available (e.g., for leasing) for each geographical location, how much is available for a third party. For example, some spectrum bands are reserved or prioritized for certain customers, such as the government or military. The spectrum right-sizing module 220 can manage spectrum leasing to adjacent customers that share the same spectrum bands by coordinating the volume of network use to avoid interference between the customers. Interference between customers results in the degradation of service and lack of reliability of the network for the customers.

Price quote module 225 may be configured to generate a price quote for the customer based on the available spectral bands to the customer location and length of service. The price quote module 225 can analyze market variables for pricing and all adjacent enterprise customers' demand for spectrum leasing to deliver a quantitative estimate of available spectral bands. The price quote module 225 can include a pricing engine and a directory of the price per spectral band per location. The spectral lease pricing can vary during the duration of service. For example, the leasing price is cheaper during non-peak times (e.g., 9 PM to 6 AM) rather than peak times (e.g., 9 AM to 5 PM) of the network.

Customer contract module 230 may be configured to output a contract to the potential customer with the price quote, the spectrum band the customer is leasing, the duration of the lease, and any leasing terms and conditions. The customer contract module 230 can send the contract to a user interface. The contract may be complete and only requiring a signature from the customer to initiate the spectrum lease. In some implementations, the contract is a smart contract that is automatically sent to the customer once conditions, such as a price quote request or lease request, are met.

Machine learning module 235 may be configured to receive a spectrum lease inquiry, identify available spectral bands, generate a price quote and contract, and send the contract for the lease to the customer. The machine learning module 235 may be configured to identify available spectral bands and generate a price quote and contract based on at least one machine-learning algorithm trained on at least one dataset reflecting user identified available spectral bands and user generated price quotes and contracts. The at least one machine-learning algorithms (and models) may be stored locally at databases and/or externally at databases (e.g., cloud databases and/or cloud servers). Client devices (e.g., personal computers, smart phones, tablets, etc.) may be equipped to access these machine learning algorithms and intelligently analyze a spectrum portfolio, identify available spectral bands, and generate a price quote and contract based on at least one machine-learning model that is trained on historical available spectral bands, prices quotes and contracts. For example, spectrum lease history may be collected to train a machine-learning model to automatically identify available spectrum bands and generate price quotes and contracts for the available spectrum bands.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process historical spectrum leases and other data stores (e.g., hardware testing settings, hardware manuals, standards, etc.) to determine how to identify available spectrum bands and generate price quotes and contracts for the available spectrum bands. Based on an aggregation of data from a spectrum leasing and registry database, external/internal portals, contract databases, and other user data stores, at least one ML model may be trained and subsequently deployed to automatically determine available spectrum bands and generate price quotes and contracts for the available spectrum bands. The trained ML model may be deployed to one or more devices. As a specific example, an instance of a trained ML model may be deployed to a server device and to a client device. The ML model deployed to a server device may be configured to be used by the client device when, for example, the client device is connected to the internet. Conversely, the ML model deployed to a client device may be configured to be used by the client device when, for example, the client device is not connected to the internet. In some instances, a client device may not be connected to the internet but still configured to receive satellite signals with spectrum leasing information. In such examples, the ML model may be locally cached by the client device.

Communications module 240 is associated with sending/receiving information (e.g., customer eligibility lookup module 215, spectrum right-sizing module 220, price quote module 225, customer contract module 230, and machine learning module 235) with a remote server or with one or more client devices, databases, routers, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 240 sends input information received by the customer eligibility lookup module 215, spectrum leasing information identified by spectrum right-sizing module 220, pricing information identified by the price quote module 225, and contract information identified by the customer contract module 230. Furthermore, communications module 240 may be configured to communicate data between a remote user device and the measurement equipment.

Figure 3A:
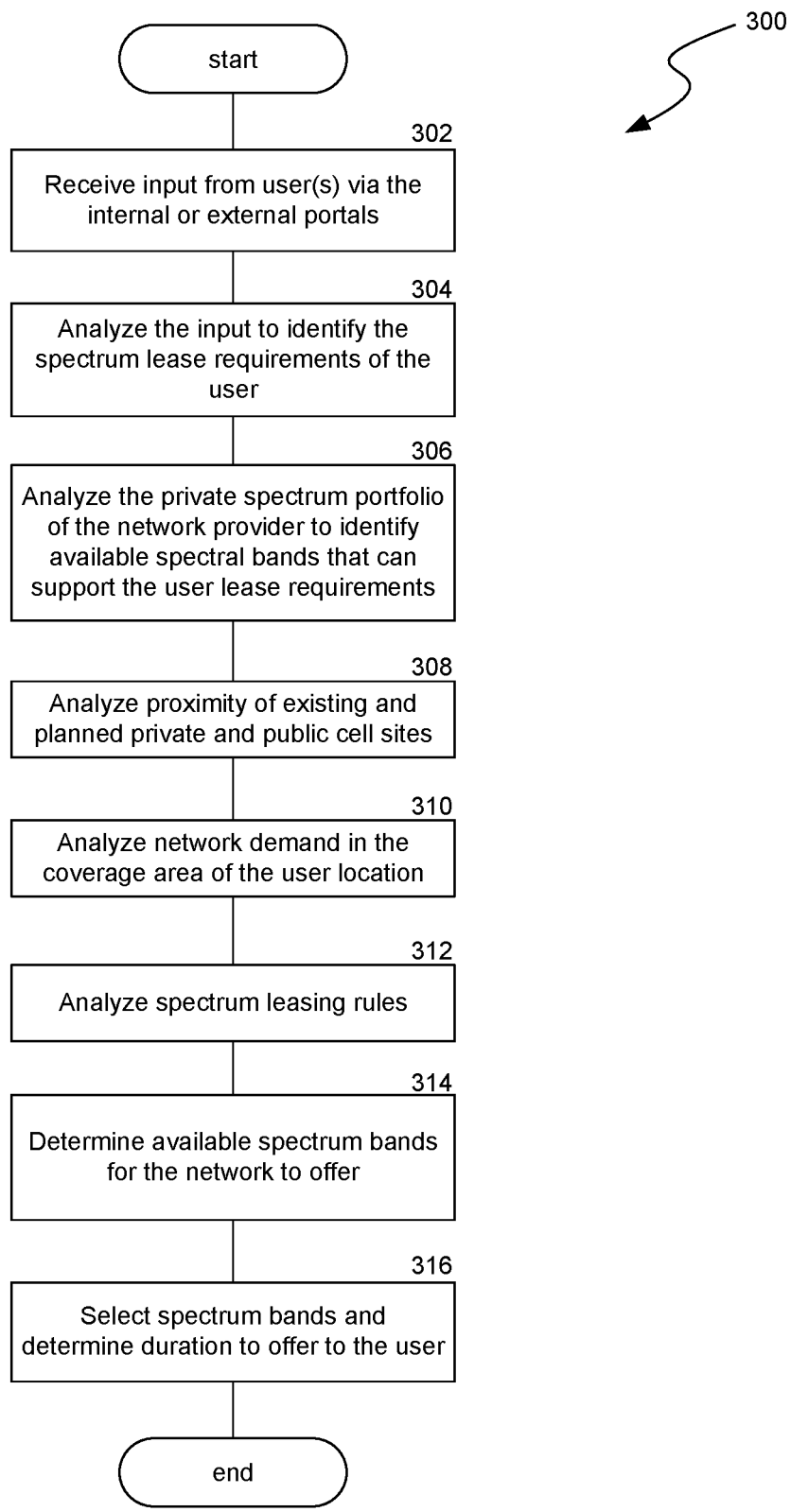
FIG. 3A is a flow diagram illustrating a process used in some implementations for selecting spectrum bands for leasing, in accordance with one or more embodiments of the present technology.

FIG. 3A is a flow diagram illustrating a process 300 used in some implementations for selecting spectrum bands for spectrum leasing. In some implementations, process 300 is triggered by a user activating a spectrum leasing application, powering on a device, the user accessing the spectrum leasing system (API) via a website portal, or the user downloading an application on a device to access the spectrum leasing system. In various implementations, some or all of process 300 is performed locally on the user device or performed by cloud-based device(s) that can provide/support the spectrum leasing system.

At block 302, the spectrum leasing system receives input information from user(s) via internal or external portals. The internal portal is a network provider internal tool for users (e.g., employees of the network provider) to input leads, such as potential customers, and unrestrictedly access spectrum information of the network provider. For example, a potential customer can contact (e.g., call or webchat) the network provider and a network provider employee can input the potential customer information into the spectrum leasing database. The internal portal allows employees to access privileged or restricted information regarding spectrum leasing, pricing, and spectrum portfolio. The external portal is a public-facing tool for external customer prospects and partners to input their information and spectrum leasing inquiries. A potential customer can learn about leasing available spectrum bands, generate inquiries, perform eligibility checks, and initiate a sales call-to-action via the external portal. For example, the potential customer accesses a spectrum leasing system via a user interface and submits a spectrum leasing inquiry after inputting all the required information. The input information can include customer network problems, size and type of customer premises, requested spectrum bands, geographic information of the customer location, or duration of service. The spectrum leasing system can collect GIS information about nearby buildings and venues to the customer location to identify and select additional monetization opportunities for the customer.

At block 304, the spectrum leasing system analyzes the input information to identify the spectrum lease requirements of the potential customer. The spectrum lease requirements can include the requested leasing term, the location of the potential customer for the network coverage, a price range the user is willing to spend on the lease, and/or the volume of network usage the user is requesting at a location. The spectrum leasing system can determine whether low frequency bands (e.g., under 1 GHz, such as band n29 in the 700 MHz range), mid frequency bands (e.g., 1 GHz-6 GHz, such as FR1 range), or high frequency bands (e.g., above 6 GHz) would be better to provide service to the customer location. For example, low frequency bands travel further than high frequency bands, and may be a better choice for an outdoor customer, while high frequency bands provide a more accurate coverage than low bands for an indoor location, such as an urban building. The spectrum leasing system can select a high frequency band for a customer location in an urban environment because a high band is easier to deploy and define a geofence area for the customer than a low band. A low band travels a greater distance than a high band and it is therefore more difficult to limit its radiation to a specific footprint.

At block 306, the spectrum leasing system analyzes the private spectrum portfolio of the network provider to identify available spectral bands that can support the user lease requirements. For example, the network provider has certain spectrum bands reserved/allocated for private use and are not available for leasing to customers. Using the customer's geolocation, the spectrum leasing system can perform a query to determine if the system has the capability to provide coverage to the geolocation.

At block 308, the spectrum leasing system analyzes proximity of existing and planned private and public cell sites to the user requested location. For example, the spectrum leasing analyses market variables for pricing and all adjacent enterprise customers' demand for spectrum leasing to determine a quantitative estimate of available spectral bands to lease to the customer location. The spectrum leasing system can determine whether the system holds the license to the spectrum bands at the user location, whether the spectrum bands are available to offer to the prospect customer, and/or are there any existing business rules that would prevent the customer from utilizing the available spectrum bands.

At block 310, the spectrum leasing system analyzes network demand from the towers serving the coverage area of the user requested location to identify available spectral bands that can support the user lease requirements. For example, the spectrum leasing system determines the network capability to provide coverage to the requested location based on current load requirements, such as existing customer demand and existing leases of customers in proximity to the user location. The spectrum leasing system can identify any conflicts between existing customers utilizing the spectrum bands providing coverage to the user location and determine whether there are sufficient bands (e.g., above a QOS threshold) to provide coverage to the potential customers requested location.

At block 312, the spectrum leasing system analyzes spectrum leasing rules to identify available spectral bands that can support the user lease requirements. For example, the spectrum leasing systems identifies pre-sales information to evaluate spectral sale feasibility and customer eligibility based on pre-set business rules (e.g., CBRS is off limits for leasing in dense urban markets, outdoor usage is prohibited in specific markets, indoor usage restrictions, height restrictions, property type restrictions, etc.) regarding what bands are available to serve the customer location.

At block 314, the spectrum leasing system determines available spectrum bands of the network to offer to the potential customer. For example, the spectrum leasing system analyses market variables for pricing and all adjacent enterprise customers' demand for spectrum leasing to determine a quantitative estimate of available spectral bands to lease to the customer location. The spectrum leasing system can identify available spectrum bands based on the geographics of a user location, the location of transmission towers, and current spectrum leases within a proximity of the user location. In some implementations, pre-established business rules for spectrum leasing can affect the availability of spectrum bands. The spectrum leasing system can determine conflicts between user requests at similar locations by analyzing the leases of existing customers. In some implementations, based on the demand, multiple customers (in adjacent or same geographic area) can share the same channels of the spectrum. For example, customers in a dense urban environment, such as adjacent buildings in a downtown, can share a channel(s) of the spectrum.

The spectrum leasing system can ensure that customers sharing a spectrum band do not interfere with each other by verifying the network can provide network capability above both customers' maximum load. In some implementations, the spectrum leasing system tracks and manages solution delivery for customers with leases (signed customers) and displays the status of solution delivery and all project records (e.g., blueprints, permits, bill of materials (BOM), etc.). By monitoring existing spectrum leases, the spectrum leasing system can identify conflicts between the user inquiries and existing spectrum leases. In some implementations, the spectrum leasing system has a mapping tool capability which provides data visualization and planning. The mapping tool can illustrate locations of existing customers and network cell sites and overlay planned RF footprints for private networks.

At block 316, the spectrum leasing system selects spectrum bands and determines a duration to offer to the user. The spectrum leasing system can select an available spectral band(s) to offer to the user that meets the user's requested network coverage. For example, the spectrum leasing system selects a spectral band that provides network coverage at a signal strength value above a QOS threshold (e.g., −90 dBm) for the duration of the service. The duration of service can be based on the duration of coverage requested by the potential customer in the inquiry. In some implementations, the spectrum leasing system determines the duration of the service based on the availability of the spectral bands. The spectrum leasing system can generate a lease based on the selected spectrum bands and duration of service.

The spectrum leasing system can select spectrum bands in the low band, mid band, or high band frequency spectrum and any combination thereof to provide to a customer. In a first example, the customer needs coverage to an outdoor area that spans six square miles, the spectrum leasing system select available spectrum bands (e.g., low frequency bands) that provide coverage to that area. In a second example, the customer needs coverage to an indoor facility, such as three floors in an urban building, the spectrum leasing system selects the available spectrum bands (e.g., high frequency bands) that would provide coverage to the indoor location. Based on the customer need, location, or environment, the spectrum leasing system can select the spectrum bands. For example, if the customer is requesting coverage at an outdoor location within a distance of a tower, the spectrum leasing system selects spectrum band n77 for the customer. Spectrum bands can be pre-allocated for customers, such as particular high bands are allocated for indoor customers of a coverage area size (e.g., amount of square footage) below a threshold, particular lower bands are allocated for outdoor customers of a coverage size above a threshold, and mid bands area allocated for a mix of outdoor and indoor customer locations.

Figure 3B:
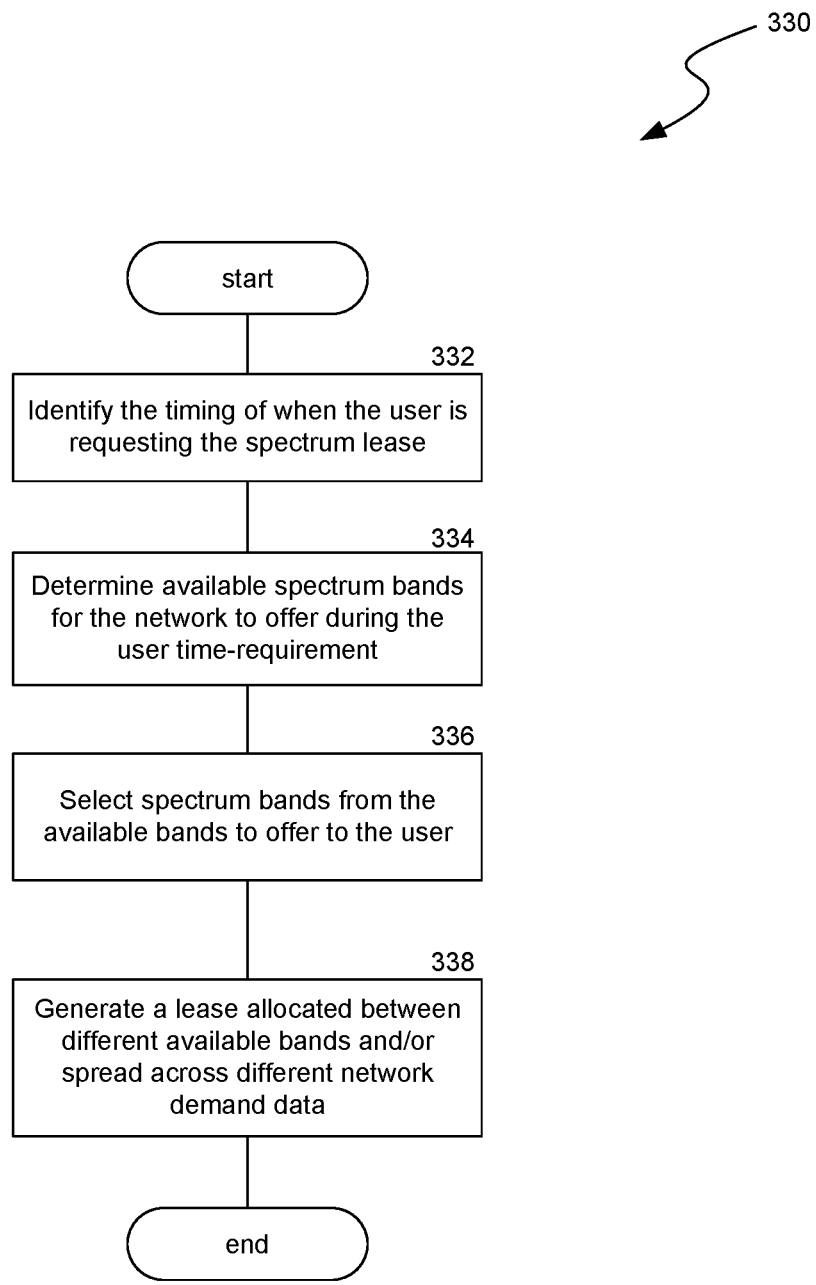
FIG. 3B is a flow diagram illustrating a process used in some implementations for spectrum leasing based on user time requirements, in accordance with one or more embodiments of the present technology.

FIG. 3B is a flow diagram illustrating a process used in some implementations for spectrum leasing based on user time requirements, in accordance with one or more embodiments of the present technology. In some implementations, process 330 is triggered by a user activating a spectrum leasing application, powering on a device, the user accessing the spectrum leasing system (API) via a website portal, or the user downloading an application on a device to access the spectrum leasing system. In various implementations, some or all of process 330 is performed locally on the user device or performed by cloud-based device(s) that can provide/support the spectrum leasing system.

At block 332, the spectrum leasing system identifies the timing information of when the user is requesting the spectrum lease. The timing information can include hours of operation, seasonal requirements, or coverage for events. For example, a casino requests a spectrum lease for the hours of the day between 5 PM and 3 AM, a construction company requests a spectrum lease at a site for the duration of building a structure, a music festival requests a spectrum lease for the duration of the weekend of the festival, or a resort requests a spectrum lease for the times of the year when they experience the most tourist activity. The spectrum leasing system can collect the timing information from the user provided in the input information at block 302 of FIG. 3A.

At block 334, the spectrum leasing system determines available spectrum bands for the network to offer during the user time-requirement. For example, spectrum leasing system identifies available spectrum bands (as described in blocks 306-314 of FIG. 3A) that match the time requirements of the user. The spectrum leasing system can identify different available bands and/or spread across different network demand data. For example, during non-peak hours (e.g., 9 PM to 6 AM) of network usage, the network is reduced on those spectrum bands. The spectrum leasing system can identify those spectrum bands and offer the spectrum bands to a customer to utilize during the non-peak hours.

At block 336, the spectrum leasing system selects spectrum bands from the available spectrum bands to offer to the user (as described in blocks 316 of FIG. 3A) that meet the time requirements. In some implementations, the spectrum leasing system can select multiple available spectrum bands to provide to the user to meet the user time requirements. For example, a first spectrum band provides network coverage to the user location for a first duration of time (e.g., hours of the day, months of the year, etc.) and a second spectrum band provides network coverage to the user location for a second duration of time. At block 338, the spectrum leasing system generates a lease allocated between different available spectrum bands and/or spread across different network demand data to meet the user time-requirement.

Figure 3C:
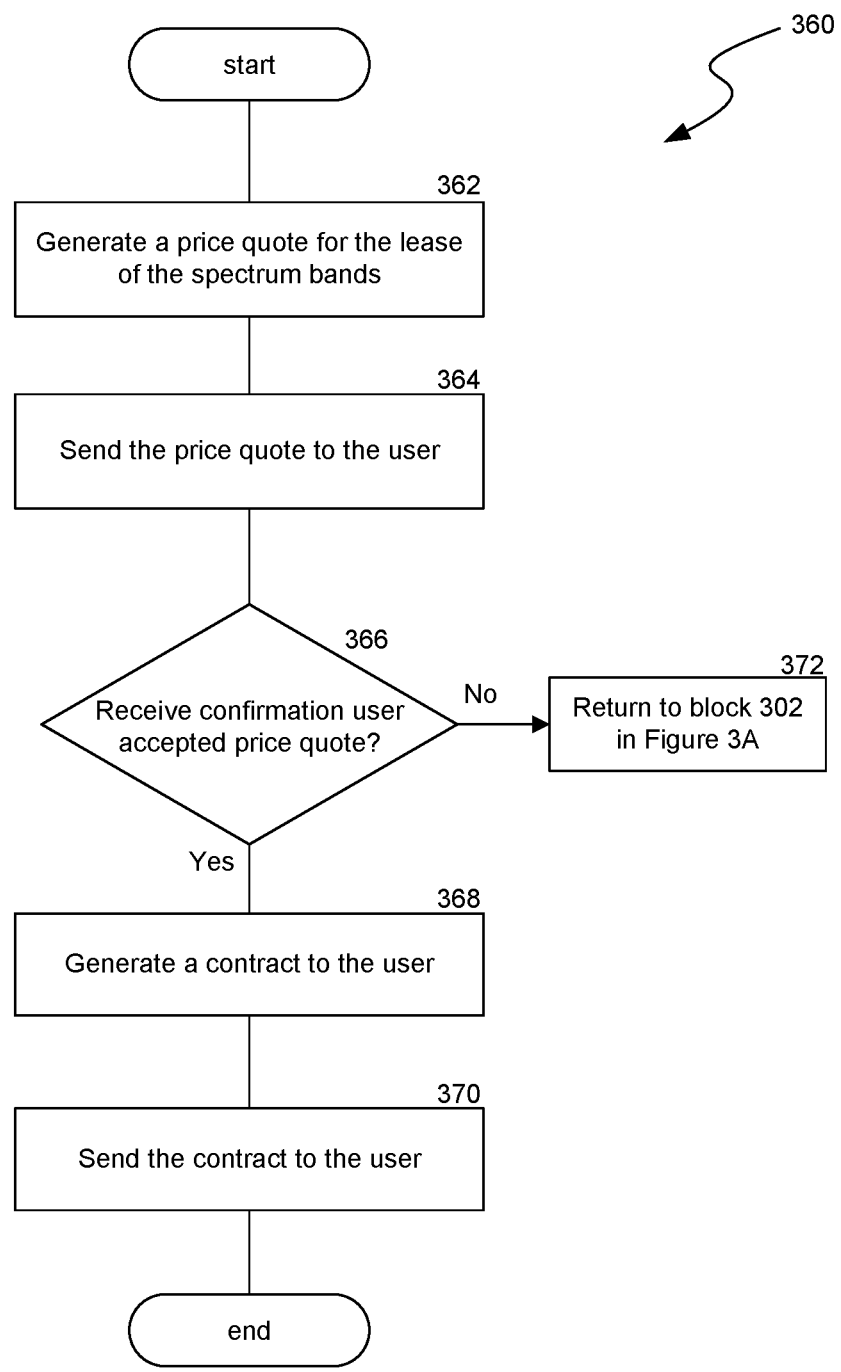
FIG. 3C is a flow diagram illustrating a process used in some implementations for generating a price quote for spectrum leasing, in accordance with one or more embodiments of the present technology.

FIG. 3C is a flow diagram illustrating a process 360 used in some implementations for generating a price quote for spectrum leasing. In some implementations, process 360 is triggered by a user activating a spectrum leasing application, powering on a device, the user accessing the spectrum leasing system (API) via a website portal, or the user downloading an application on a device to access the spectrum leasing system. In various implementations, some or all of process 360 is performed locally on the user device or performed by cloud-based device(s) that can provide/support the spectrum leasing system.

At block 362, the spectrum leasing system generates a price quote for the lease of the spectrum bands for the determined duration of service. The price quote can include various options for the user, such as different prices for different network capability at the user location. The spectrum leasing system can determine a price to lease the spectrum band(s) based on a market value for the spectrum band(s) being leased to the customer, the customer location (e.g., urban, or rural), the customer network need at the location, the price the spectrum provider paid for the spectrum band in an FCC auction, partial economic area of the requested coverage location, or the price of the license for the spectrum channel. In a first example, a spectrum band for an urban metro area is more expensive than a rural area. In a second example, the price to lease a spectrum band(s) to the customer location is based on the market rate of existing customers within a proximity of the customer location. In some cases, the price to lease a spectrum band(s) to the customer location is based on the demand. For example, in an urban environment where there is a high demand for service, the spectrum leasing system increases or decreases the price to lease the spectrum bands to the customer location.

At block 364, the spectrum leasing system sends the price quote to the user interface. A user can click a button in the user interface to display the price quote. The price quote can include variations of spectral lease pricing during the duration of service based on when the network is a peak or non-peak usage. For example, the potential customers receive a cheaper price is they access the network during non-peak hours (e.g., 9 PM to 6 AM) rather than peak hours (e.g., 9 AM to 7 PM). The user can accept/decline the price quote in the user interface of the spectrum leasing system.

At block 366, the spectrum leasing system determines whether the user accepted the price quote and wants to enter the spectrum leasing agreement. The user can accept the price quote via the user interface of the spectrum leasing system. For example, the user can reply to a message or select a button/icon in the user interface to provide acknowledgement/confirmation they accept the price quote. When the user declines the price quote, at block 372, the spectrum leasing system can collect additional user inputs (at block 302 of FIG. 3A).

When the user accepts the price quote, at block 368, the spectrum leasing system generates a contract for the spectrum lease. The contract can include the terms, conditions, the spectrum band, and duration of the lease (e.g., 30 MHz of CBRS spectrum for 18 months). At block 370, the spectrum leasing system sends the contract to the user interface. The spectrum leasing system can auto populate the contract with the leasing information, so a user can present the contract to a legal representative, CFO, CEO, etc., for signature to initiate the lease in an effective and efficient manner. The spectrum leasing system can send the contract to the user interface and the user can sign the contract to initiate the lease. Once the contract is signed and payment is initiated, the spectrum leasing system can automatically generate invoices for billing and communicate with the network provider to provide the spectrum bands to the customer location for the duration of the lease. The spectrum leasing system can store spectrum licenses by geography, spectral band use by customer, public cellular network spectral use, spectral lookup logic, channel swaps, coordination agreements, and signed contracts in a leasing database (such as spectrum registry and leasing database 412 of FIG. 4).

Figure 4:
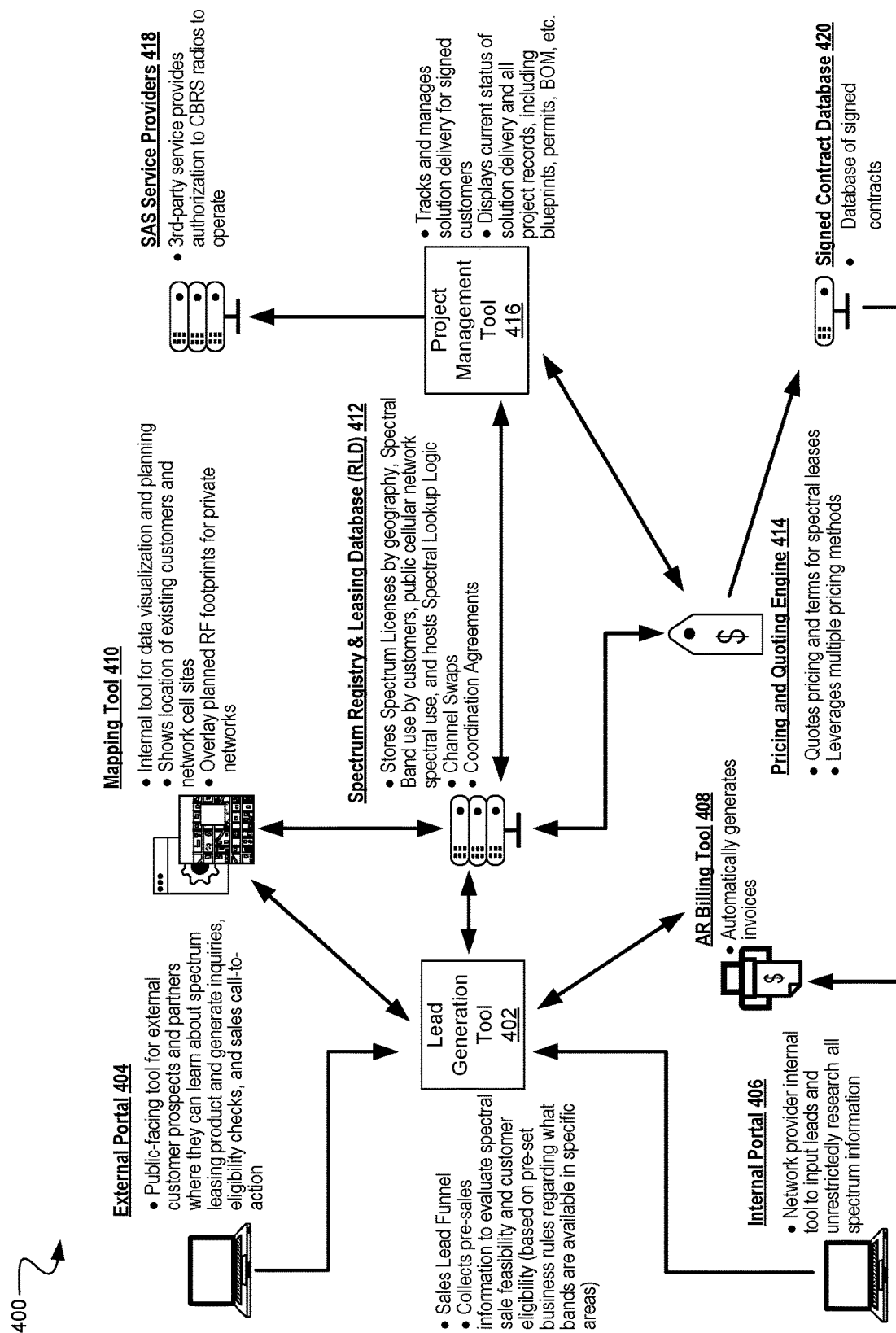
FIG. 4 illustrates an example of spectrum leasing components in accordance with one or more embodiments of the present technology.

FIG. 4 illustrates an example of components of a spectrum leasing system 400. The components of a spectrum leasing system 400 can includes lead generation tool 402, external portal 404, internal portal 406, AR billing tool 408, mapping tool 410, spectrum registry and leasing database (RDL) 412, pricing and quoting engine 414, project management tool 416, SAS service providers 418, and signed contract database 420.

Lead generation tool 402 can operate as a sales lead funnel by collecting pre-sales information, from external portal 404 and internal portal 406, to evaluate spectral sale feasibility and customer eligibility based on pre-set business rules regarding what spectral bands are available in specific areas. The internal portal 406 is a network provider internal tool for users (e.g., employees of the network provider) to input leads and unrestrictedly research all spectrum information. The external portal 404 is a public-facing tool for external customer prospects and partners to input their information and spectrum leasing inquiries. A potential customer can learn about leasing available spectrum bands, generate inquiries, perform eligibility checks, and initiate a sales call-to-action via the external portal 404. The lead generation tool 402 can interrogate the RDL database 412 for proposed spectral use which is data necessary to evaluate and propose spectral sales.

The mapping tool 410 is an internal tool for data visualization and planning and shows locations of existing customers and network (e.g., 5G) cell sites. The mapping tool 410 can overlay planned RF footprints for private networks on the current system to illustrate the impact. The mapping tool 410 can communicate information with the lead generation tool 402 and the spectrum registry and leasing database (RLD) 412. The spectrum RLD 412 stores spectrum licenses by geography, spectral band use by customers, public cellular network spectral use, and hosts the spectral lookup logic. The spectrum RLD 412 can store channel swaps and coordination agreements. The spectrum RLD 412 can store pricing and quote information from the pricing and quoting engine 414. The spectrum RLD 412 can store information from the lead generation tool 402 and the project management tool 416.

The project management tool 416 tracks and manages solution delivery for signed customers and displays the status of solution delivery and project records (e.g., blueprints, permits, BOM, etc.). The project management tool 416 can identify user inquiries that have conflicts with existing spectrum leases. The project management tool 416 can communicate with the SAS service providers 418. The SAS service providers 418 is a 3rd-party service that provides authorization to CBRS radios to operate. The project management tool 416 can communicate with the pricing and quoting engine 414.

The pricing and quoting engine 414 generates and provides pricing quotes and terms for spectral leases. The pricing and quoting engine 414 can leverage multiple pricing methods to generate the pricing quote regarding for a spectral lease. The pricing and quoting engine 414 can communicate with the signed contract database 420 (e.g., database of generated contracts and signed contracts). The signed contract database 420 can send contract information to the AR billing tool 408. The AR billing tool 408 can automatically generate invoices when a customer signs a contract for a spectral band lease. The AR billing tool 408 can communicate billing information with the lead generation tool 402.

Figure 5:
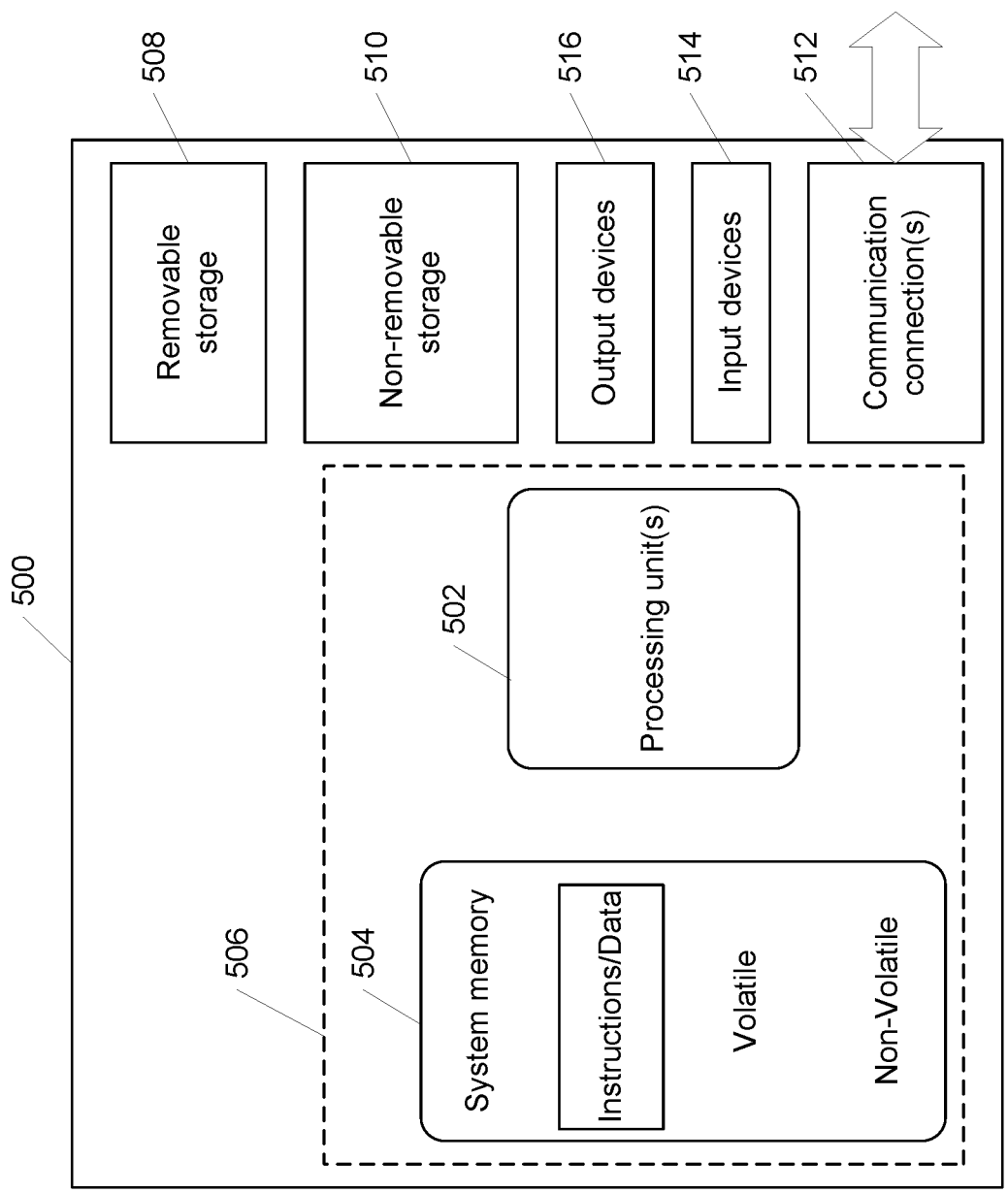
FIG. 5 illustrates one example of a suitable operating environment in which one or more of the present embodiments may be implemented.

FIG. 5 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable 508 and/or non-removable 510) including, but not limited to, magnetic or optical disks or tape. Similarly, environment 500 may also have input device(s) 514 such as keyboard, mouse, pen, voice input, etc., and/or output device(s) 516 such as a display, speakers, printer, etc.

Also included in the environment may be one or more communication connections, 512, such as Bluetooth, WiFi, WiMax, LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 500 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims. Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method for leasing spectrum bands, the method comprising:
   receiving, by a spectrum leasing system via a user interface, a request for access to a licensed spectrum provided to a geolocation, wherein the request includes data indicating whether the request is for an outdoor environment or an indoor environment at the geolocation;
   identifying, by the spectrum leasing system, at least one spectrum band of the licensed spectrum based on the outdoor environment or the indoor environment at the geolocation by determining:
      the at least one spectrum band provides network connectivity above a quality-of-service threshold for the outdoor environment or the indoor environment at the geolocation,
      the at least one spectrum band is available for spectrum leasing, and
      a duration the at least one spectrum band is available;
   generating, by the spectrum leasing system, a mapping of the licensed spectrum to illustrate locations of existing customers and network cell sites of the licensed spectrum;
   overlaying, by the spectrum leasing system, a radio-frequency footprint for the at least one spectrum band on the mapping of the licensed spectrum;
   generating, by the spectrum leasing system, a price quote for a lease of the at least one spectrum band based on the availability of the at least one spectrum band for leasing and a lease duration; and
   displaying, by the spectrum leasing system via the user interface, the mapping of the licensed spectrum and the price quote for the lease.

2. The method of claim 1, further comprising:
   receiving, via the user interface, a confirmation that a user accepts the price quote;
   generating a contract for the lease based on the at least one spectrum band and the lease duration; and
   displaying, in the user interface, the contract for the user to sign.

3. The method of claim 2, further comprising:
   in response the user signing the contract, automatically generating billing invoices for the lease.

4. The method of claim 1, further comprising:
   analyzing a spectrum portfolio to identify spectrum bands available for leasing to the geolocation.

5. The method of claim 1, the method further comprising:
   displaying, in the user interface, spectrum bands available for leasing to the geolocation.

6. The method of claim 1, wherein the at least one spectrum band is identified by at least one machine-learning algorithm, wherein the at least one machine-learning algorithm is trained based on at least one dataset associated with previously identified spectrum bands.

7. The method of claim 1, wherein the request includes a size and type of user premises, at least one requested spectrum band, geographic information of the geolocation, or a user requested duration for the lease.

8. A computing system comprising:
   one or more processors; and
   one or more memories storing instructions that, when executed by the one or more processors, cause the computing system to perform a process for leasing spectrum bands, the process comprising:
      receiving, by a spectrum leasing system via a user interface, a request for access to a licensed spectrum provided to a geolocation, wherein the request includes data indicating whether the request is for an outdoor environment or an indoor environment at the geolocation;
      identifying, by the spectrum leasing system, at least one spectrum band of the licensed spectrum based on the outdoor environment or the indoor environment at the geolocation by determining:
         the at least one spectrum band provides network connectivity above a quality-of-service threshold for the outdoor environment or the indoor environment at the geolocation,
         the at least one spectrum band is available for spectrum leasing, and
         a duration the at least one spectrum band is available;

generating, by the spectrum leasing system, a mapping of the licensed spectrum to illustrate locations of existing customers and network cell sites of the licensed spectrum;

overlaying, by the spectrum leasing system, a radio-frequency footprint for the at least one spectrum band on the mapping of the licensed spectrum;

generating, by the spectrum leasing system, a price quote for a lease of the at least one spectrum band based on the availability of the at least one spectrum band for leasing and a lease duration; and displaying, by the spectrum leasing system via the user interface, the mapping of the licensed spectrum and the price quote for the lease.

9. The computing system of claim 8, wherein the process further comprises:

receiving, via the user interface, a confirmation that a user accepts the price quote;

generating a contract for the lease based on the at least one spectrum band and the lease duration; and displaying, in the user interface, the contract for the user to sign.

10. The computing system of claim 9, wherein the process further comprises:

in response the user signing the contract, automatically generating billing invoices for the lease.

11. The computing system of claim 8, wherein the process further comprises:

analyzing a spectrum portfolio to identify spectrum bands available for leasing to the geolocation.

12. The computing system of claim 8, wherein the process further comprises:

displaying, in the user interface, spectrum bands available for leasing to the geolocation.

13. The computing system of claim 8, wherein the at least one spectrum band is identified by at least one machine-learning algorithm, wherein the at least one machine-learning algorithm is trained based on at least one dataset associated with previously identified spectrum bands.

14. The computing system of claim 8, wherein the request includes a size and type of user premises, at least one requested spectrum band, geographic information of the geolocation, or a user requested duration for the lease.

15. A non-transitory computer-readable medium storing instructions that, when executed by a computing system, cause the computing system to perform operations for leasing spectrum bands, the operations comprising:

receiving, by a spectrum leasing system via a user interface, a request for access to a licensed spectrum provided to a geolocation, wherein the request includes data indicating whether the request is for an outdoor environment or an indoor environment at the geolocation;

identifying, by the spectrum leasing system, at least one spectrum band of the licensed spectrum based on the outdoor environment or the indoor environment at the geolocation by determining:

the at least one spectrum band provides network connectivity above a quality-of-service threshold for the outdoor environment or the indoor environment at the geolocation, the at least one spectrum band is available for spectrum leasing, and a duration the at least one spectrum band is available;

generating, by the spectrum leasing system, a mapping of the licensed spectrum to illustrate locations of existing customers and network cell sites of the licensed spectrum;

overlaying, by the spectrum leasing system, a radio-frequency footprint for the at least one spectrum band on the mapping of the licensed spectrum;

generating, by the spectrum leasing system, a price quote for a lease of the at least one spectrum band based on the availability of the at least one spectrum band for leasing and a lease duration; and displaying, by the spectrum leasing system via the user interface, the mapping of the licensed spectrum and the price quote for the lease.

16. The non-transitory computer-readable medium of claim 15, wherein the operations further comprise:

receiving, via the user interface, a confirmation that a user accepts the price quote;

generating a contract for the lease based on the at least one spectrum band and the lease duration; and displaying, in the user interface, the contract for the user to sign.

17. The non-transitory computer-readable medium of claim 16, wherein the operations further comprise:

in response the user signing the contract, automatically generating billing invoices for the lease.

18. The non-transitory computer-readable medium of claim 15, wherein the operations further comprise:

analyzing a spectrum portfolio to identify spectrum bands available for leasing to the geolocation; and displaying, in the user interface, the spectrum bands available for leasing to the geolocation.

19. The non-transitory computer-readable medium of claim 15, wherein the at least one spectrum band is identified by at least one machine-learning algorithm, wherein the at least one machine-learning algorithm is trained based on at least one dataset associated with previously identified spectrum bands.

20. The non-transitory computer-readable medium of claim 15, wherein the request includes a size and type of user premises, at least one requested spectrum band, geographic information of the geolocation, or a user requested duration for the lease.

* * * * *